J. CHANAUD.

EXERCISING APPARATUS.

Reissued Mar. 25, 1919. APPLICATION FILED JAN. 25, 1919. 14,618.

WITNESSES

John P. Woodworth

S. M. McColl

INVENTOR

Jean Chanaud,

BY Richard Bowen,

ATTORNEY

THE NORRIS PETERS CO., PHOTO-LITHO., WASHINGTON, D. C.

UNITED STATES PATENT OFFICE.

JEAN CHANAUD, OF NEW YORK, N. Y.

EXERCISING APPARATUS.

14,618. Specification of Reissued Letters Patent. Reissued Mar. 25, 1919.

Original No. 1,285,620, dated November 26, 1918, Serial No. 182,292, filed July 23, 1917. Application for reissue filed January 25, 1919. Serial No. 273,202.

*To all whom it may concern:*

Be it known that I, JEAN CHANAUD, a citizen of France, residing at New York city, in the county of New York and State of New York, have invented certain new and useful Improvements in Exercising Apparatus, of which the following is a specification.

This invention relates to exercising apparatus for developing the muscles of the human body.

The main object of the invention is to so construct an apparatus of this character to provide for the rotation of the upper part of the body of the user while the arms are in out-stretched position and with the same strain exerted upon each arm.

Another object is to so construct an apparatus of this character as to allow movements of great amplitude and yet use only an ordinary coiled spring.

Another object is to so construct an apparatus of this character in which the cables will be prevented from becoming entangled when not in use.

Still another object of the invention is to provide apparatus of this character, the parts of which are designed to be mounted on supports arranged at diametrically opposite points to permit the device to be employed for exercises which could not otherwise be accomplished.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
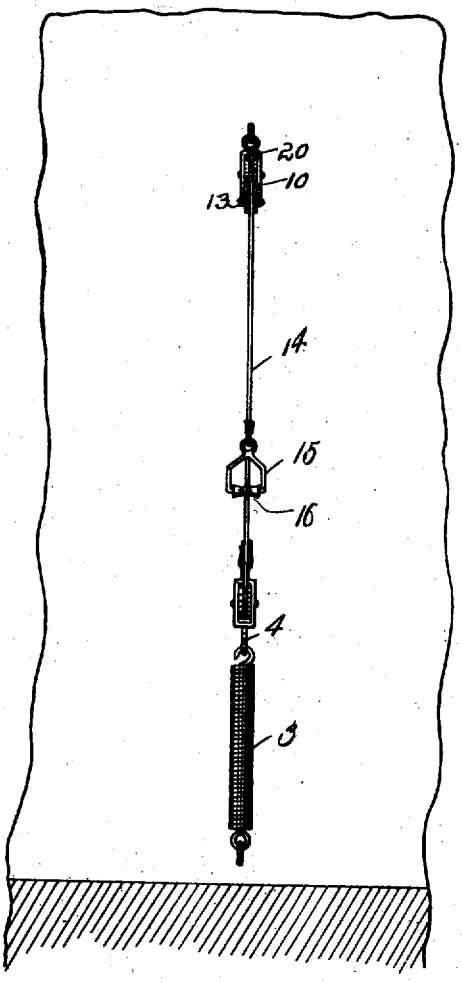
Figure 1 is a front elevation of the apparatus.

In the embodiment illustrated the improved apparatus embodying this invention is shown mounted upon a suitable support and includes vertically spaced supporting hooks. A coiled spring 3 of heavy wire and of ample strength to resist the strains to which it may be subjected is shown connected at one end with the lower hook while the other end of said spring is engaged with a hook 4 of a tackle supported by a cord or cable 14. Another tackle 10 is supported on the upper hook being engaged therewith by means of an eye and carries a pulley 13 rotatably mounted therein.

A flexible cord or cable 14 which may be of any suitable or desired length and which is connected with the tackle at one end, passes over pulley 13, and is provided at its free end with a hand grip 15 constructed preferably as shown in Fig. 1 and having a roller 16 to permit the device to slip within the hand of the exerciser without injuring it.

Figure 2:
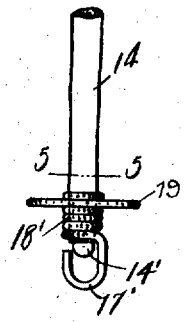
Fig. 2 is a similar view of the lower end of the cord or cable showing a slightly different form of connection for the hand grip.

The hand grips 15 one only of which is here shown are preferably detachably connected with the free ends of the cables 14 by means of hooks as 17′ carried by one end of a heavy wire which is coiled tightly around the end of the cable 14 as is shown clearly in Fig. 2 and by means of which said hook is securely attached to the cable.

Figure 3:
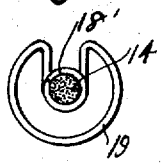
Fig. 3 is a transverse section taken on the line 5—5 of Fig. 2 looking downward.

In Fig. 2 the hook 17′ is shown with the end thereof in alinement with the cable and the stop is formed by winding the opposite end of the wire 18′ around the cable 14 and forming a substantially U-shaped loop 19 as is shown clearly in Fig. 3. This loop 19 which projects laterally or radially from the cable 14 will operate to prevent the passage of the cable end through pulley 13 should it be released with the hand grip removed. The cable 14 projects into hook 17′ and is rounded, as at 14′ so as to close the hook thus preventing accidental removal of the handle or grip 15.

Figure 4:
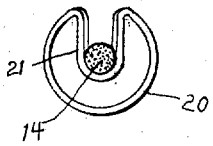
Fig. 4 is a detail of the limiting member for the cable.

A limiting or stop member 20, shown more clearly in Fig. 4 is secured about cable 14 adjacent pulley 13. This member is in the shape of a loop formed from a piece of spring wire and bent in upon itself to form a spring clip 21 which is adapted to grip firmly cable 14. Member 20 is of such size as not to pass between the top bar of the frame supporting the pulley 13 and said pulley. This limiting member may be quickly and easily adjusted on cable 14 so as to maintain the cable under tension when grip 15 is released.

By constructing and mounting the cable 14 in the manner above described and as shown when the hand grips 15 are released by the user, the coiled springs 3 will draw them upward and hold the cable under tension thereby preventing all possibility of the stretches thereof becoming entangled.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

In an exercising apparatus including a block and cable, means for limiting movement of the cable through the block, including a single strand of wire having one terminal coiled about the cable to form closely spaced convolutions and a single larger convolution spaced from the cable to form a stop, the other terminal being formed into a hook for the purpose set forth.

In testimony whereof I affix my signature in presence of two witnesses.

JEAN CHANAUD.

Witnesses:

WILLIAM S. FOWLER,
FRANK J. RINALDI.

Copies of this patent may be obtained for five cents each, by addressing the "Commissioner of Patents, Washington, D. C."